(12) United States Patent
Chien

(10) Patent No.: US 6,923,344 B1
(45) Date of Patent: Aug. 2, 2005

(54) EASY AND QUANTITATIVE LIQUID DISPENSER

(75) Inventor: Yen-Liang Chien, Taipei (TW)

(73) Assignee: Tops Equipment & Tools Co., Ltd., Taipei (TW)

( * ) Notice: Subject to any disclaimer, the term of this patent is extended or adjusted under 35 U.S.C. 154(b) by 0 days.

(21) Appl. No.: 10/756,322

(22) Filed: Jan. 14, 2004

(51) Int. Cl.$^7$ ............................. B67D 5/38; G01F 11/28
(52) U.S. Cl. ...................... 222/158; 222/207; 222/438; 222/464.1
(58) Field of Search .............................. 222/154, 158, 222/205, 207, 434, 438–440, 448, 464.1

(56) References Cited

U.S. PATENT DOCUMENTS

| | | | | |
|---|---|---|---|---|
| 2,487,825 A | * | 11/1949 | Olvis | 222/439 |
| 4,105,142 A | * | 8/1978 | Morris, Jr. | 222/158 |
| 5,330,081 A | * | 7/1994 | Davenport | 222/207 |
| 5,363,991 A | * | 11/1994 | Reyman | 222/207 |
| 5,392,966 A | * | 2/1995 | Bunin | 222/454 |
| D400,434 S | * | 11/1998 | Amos et al. | D9/524 |
| 5,833,124 A | * | 11/1998 | Groves et al. | 222/158 |
| 6,330,960 B1 | * | 12/2001 | Faughey et al. | 222/205 |
| 6,334,550 B1 | * | 1/2002 | De Backer | 222/205 |
| D499,023 S | * | 11/2004 | Amos et al. | D9/434 |

* cited by examiner

Primary Examiner—Gene Mancene
Assistant Examiner—Patrick Buechner
(74) Attorney, Agent, or Firm—Rosenberg, Klein & Lee

(57) ABSTRACT

An easy and quantitative liquid dispenser is disclosed. The dispenser includes a regulator cock, an upper cover and a container. The container has a cylinder mounted on a bottom thereof, the cylinder is connected with the container, and a closure is mounted between the container and the cylinder. The upper cover has an outlet properly mounted thereon, a safety cover is connected to the upper cover through a rim of the upper cover and is covered on the outlet, and furthermore, a guiding pillar is downwardly extended from a bottom of the upper cover. The regulator cock is a plate which has a pillar extended from a bottom thereof, a circular prominence is mounted on a bottom end of the pillar, and a guiding hole is centrally penetrated through the pillar and the plate. After assembling the components above, the quantitative liquid dispenser according to the present invention can be formed so as to accurately measure and pour out the liquid.

5 Claims, 4 Drawing Sheets

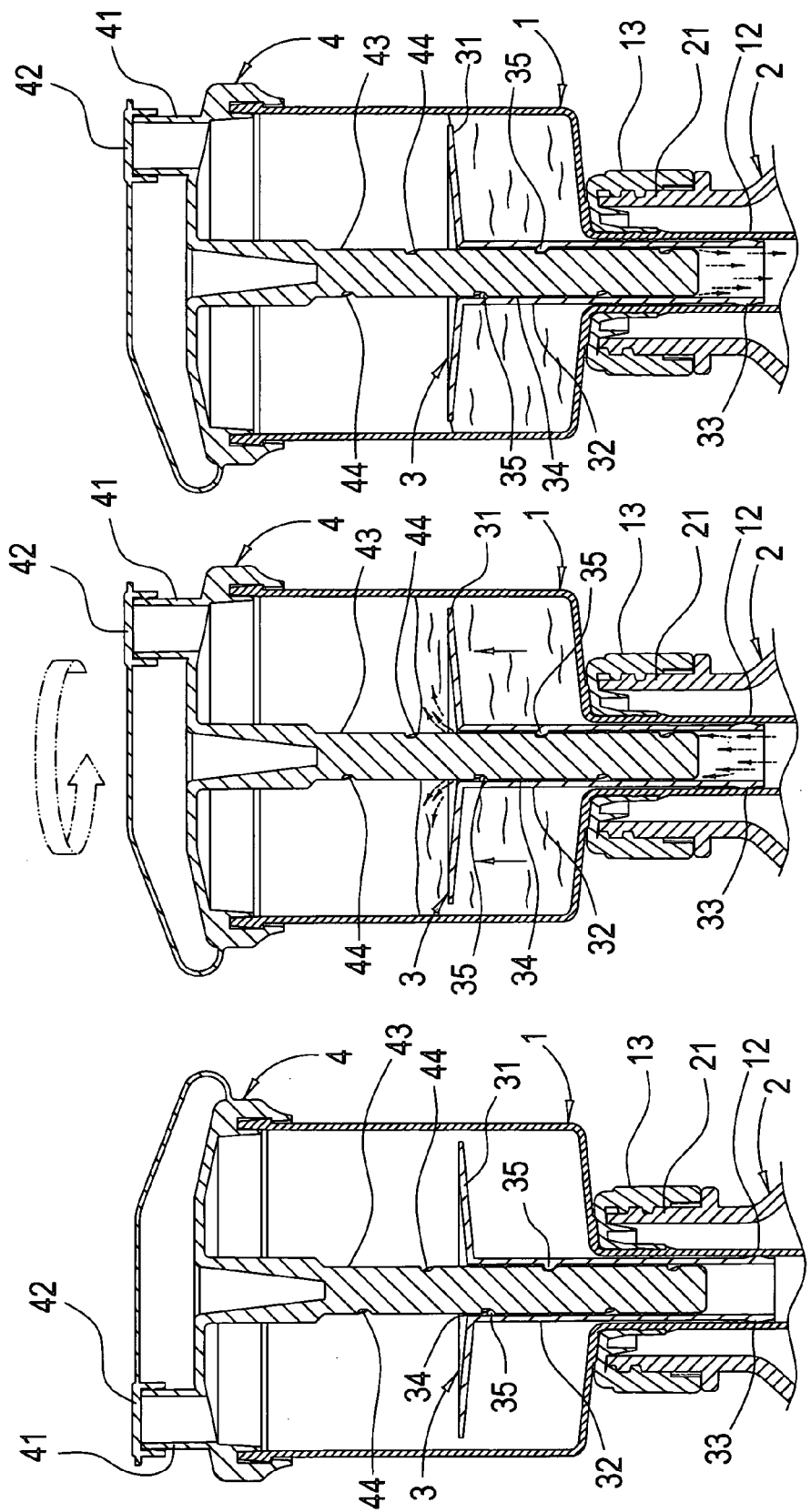

US 6,923,344 B1

EASY AND QUANTITATIVE LIQUID DISPENSER

BACKGROUND OF THE INVENTION

1. Field of the Invention

The present invention is related to an easy and quantitative liquid dispenser, and more particular to an easy and quantitative liquid dispenser which can accurately measure and pour out a quantitative liquid.

2. Description of the Prior Art

Generally, people sometimes need to take a liquid, ex: a cleaner, an insecticide, a concentrate, or a lightly concentrated cream, out of a container and always have to pour out a fixed amount of liquid. However, it is usually difficult to pour out an accurately desired amount unless a separate Measuring device/cup is applied to and sometimes will pour out an excess amount of liquid. Furthermore, it is possible that the excess liquid may touch the user. If the liquid is dangerous (ex: sulfuric acid), it might cause a safety problem.

Because of the obstruction described above, people need to buy an additional measuring cup or a dilution bottle. But, it still difficult for the user to pour out a correct amount of liquid within a limit time say less than one minute, and further, the user has to further pay the measuring cup.

Thus, it can be seen, the prior art described above still has some defects, is not a good design, however, and is urgently to be improved.

Because of the technical defects of described above, the applicant keeps on carving unflaggingly to develop an easy and quantitative liquid dispenser through wholehearted experience and research.

SUMMARY OF THE INVENTION

An object of the present invention is to provide an easy and quantitative liquid dispenser which can measure and pour out an accurate amount of liquid for avoiding an excess amount of liquid from being poured out.

Another object of the present invention is to provide an easy and quantitative liquid dispenser which is suitable for measuring all kinds of liquids, for example, a cleaner, an insecticide, a concentrate, or a lightly concentrated cream so as to save the cost of paying another dilution bottle.

Another further object of the present invention is to provide an easy and quantitative liquid dispenser having a safety cover mounted thereon for avoiding the liquid from being spilled out so that the user will not be touched by the liquid and therefore a safe dispenser can be achieved.

Further another object of the present invention is to provide an easy and quantitative liquid dispenser having a characteristic of quantitatively measuring a liquid so as to achieve easy and simple usage and efficiency.

For achieving the purposes described above, the easy and quantitative liquid dispenser mainly includes a regulator cock, an upper cover and a container. The regulator cock is a plate which has a pillar extended from a bottom thereof, a circular prominence is mounted on a bottom end of the pillar, a guiding hole is centrally penetrated through the pillar and the plate and a guiding block is properly positioned inside the guiding hole. The container has a cylinder mounted at a central portion of a bottom thereof, the cylinder is connected with the container, a closure is mounted between the container and the cylinder, and the closure can be locked on a mouth of a bottle with different standards. The upper cover has an outlet properly mounted thereon, a safety cover is connected to the upper cover through a rim of the upper cover and is covered on the outlet, and furthermore, a guiding pillar is downwardly extended from a bottom of the upper cover and has plural equidistant corkscrew guiding troughs respectively mounted at two sides thereof. After sleeving the pillar of the regulator cock on the cylinder of the container and covering the upper cover on the container for perforating the guiding pillar into the guiding hole of the regulator cock, the quantitative liquid dispenser according to the present invention can be formed so as to accurately measure and pour out the liquid.

BRIEF DESCRIPTION OF THE DRAWINGS

The drawings disclose an illustrative embodiment of the present invention which serves to exemplify the various advantages and objects hereof, and are as follows:

FIGS. 4A–4C are sectional drawing showing the operations of a quantitative liquid dispenser according to the present invention.

DETAILED DESCRIPTION OF THE PREFERRED EMBODIMENT

Figure 1:
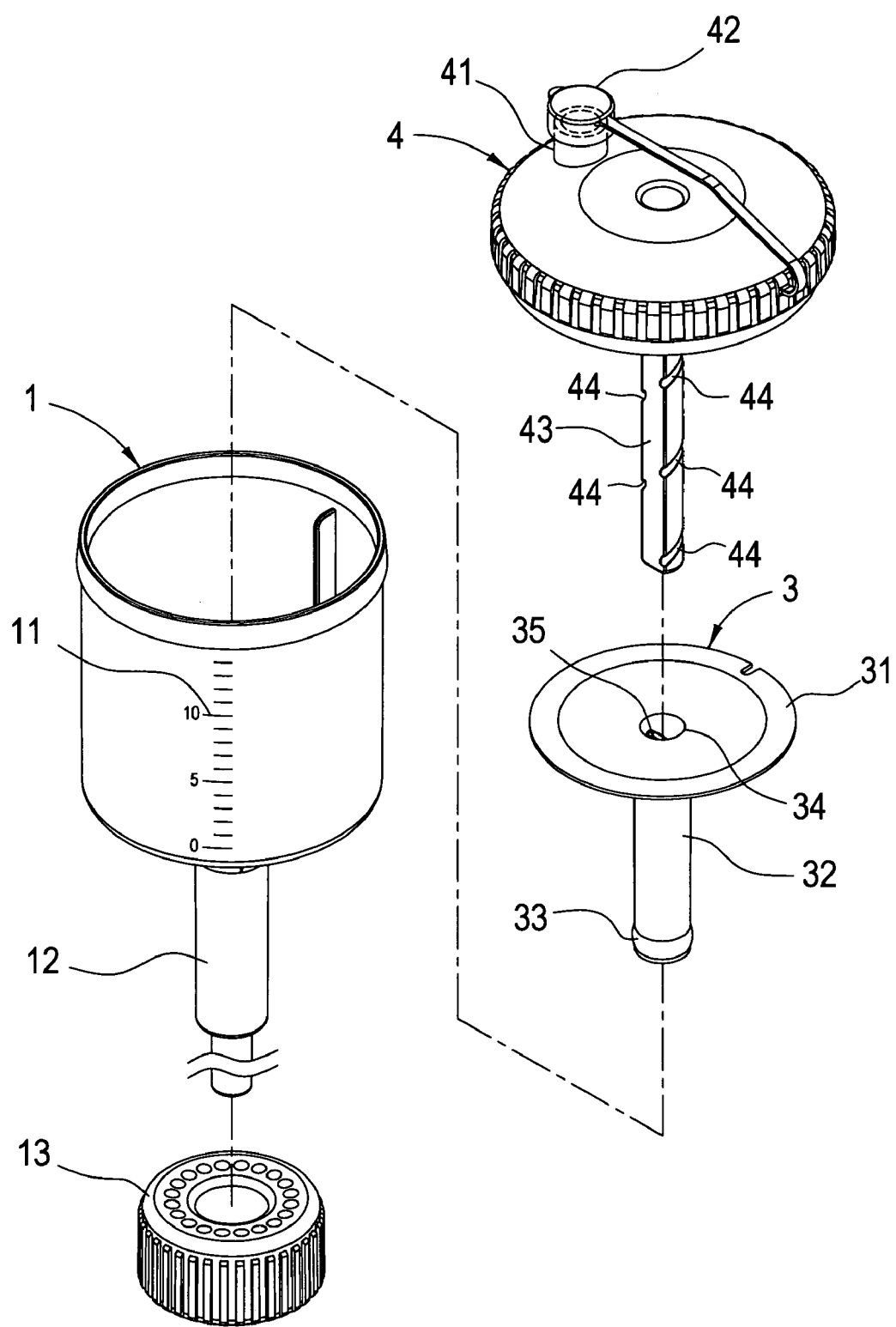
FIG. 1 is a three-dimensional decomposition view showing an easy and quantitative liquid dispenser according to the present invention.
Figure 2:
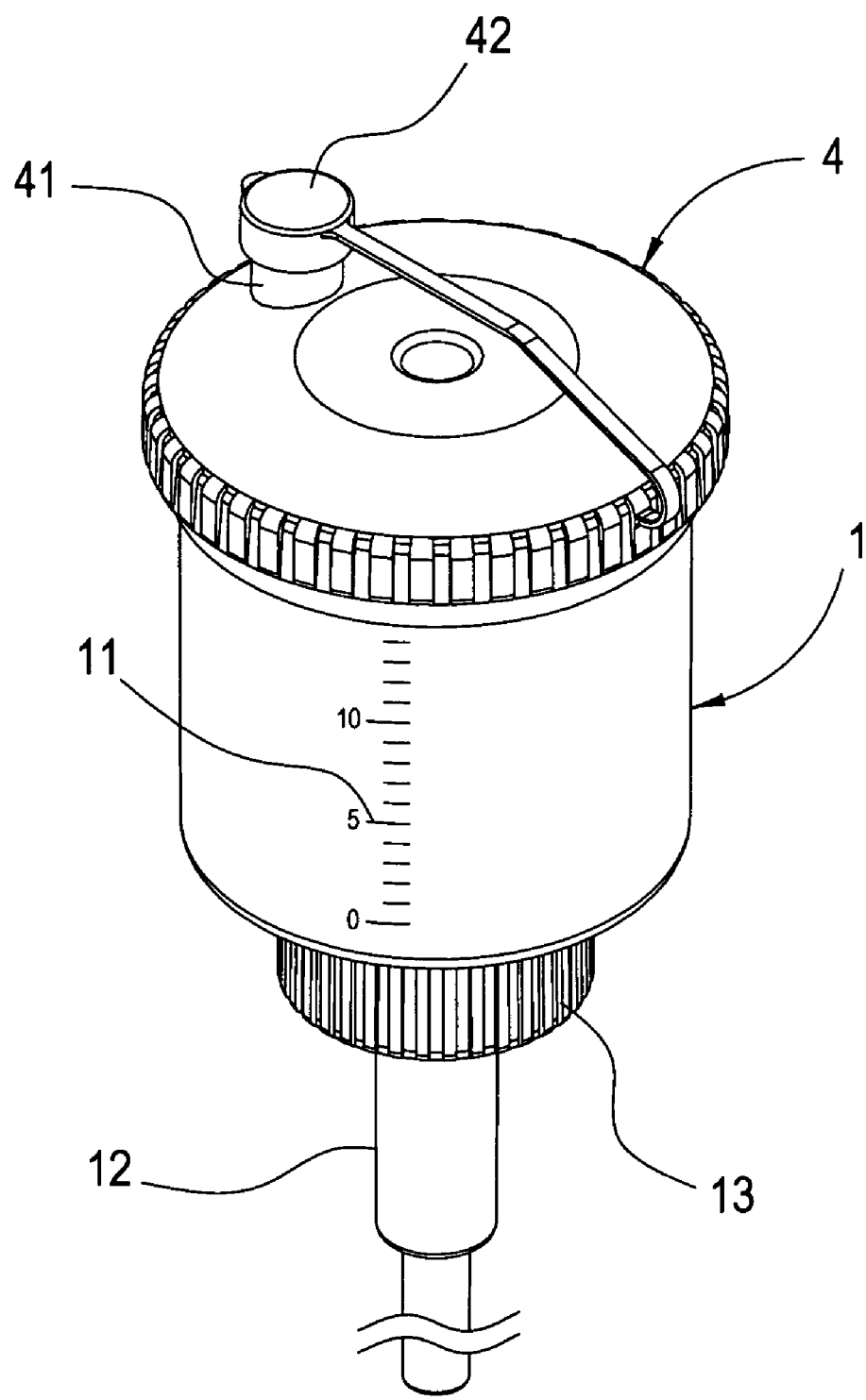
FIG. 2 is a three-dimensional view showing a combined quantitative liquid dispenser according to the present invention.
Figure 3:
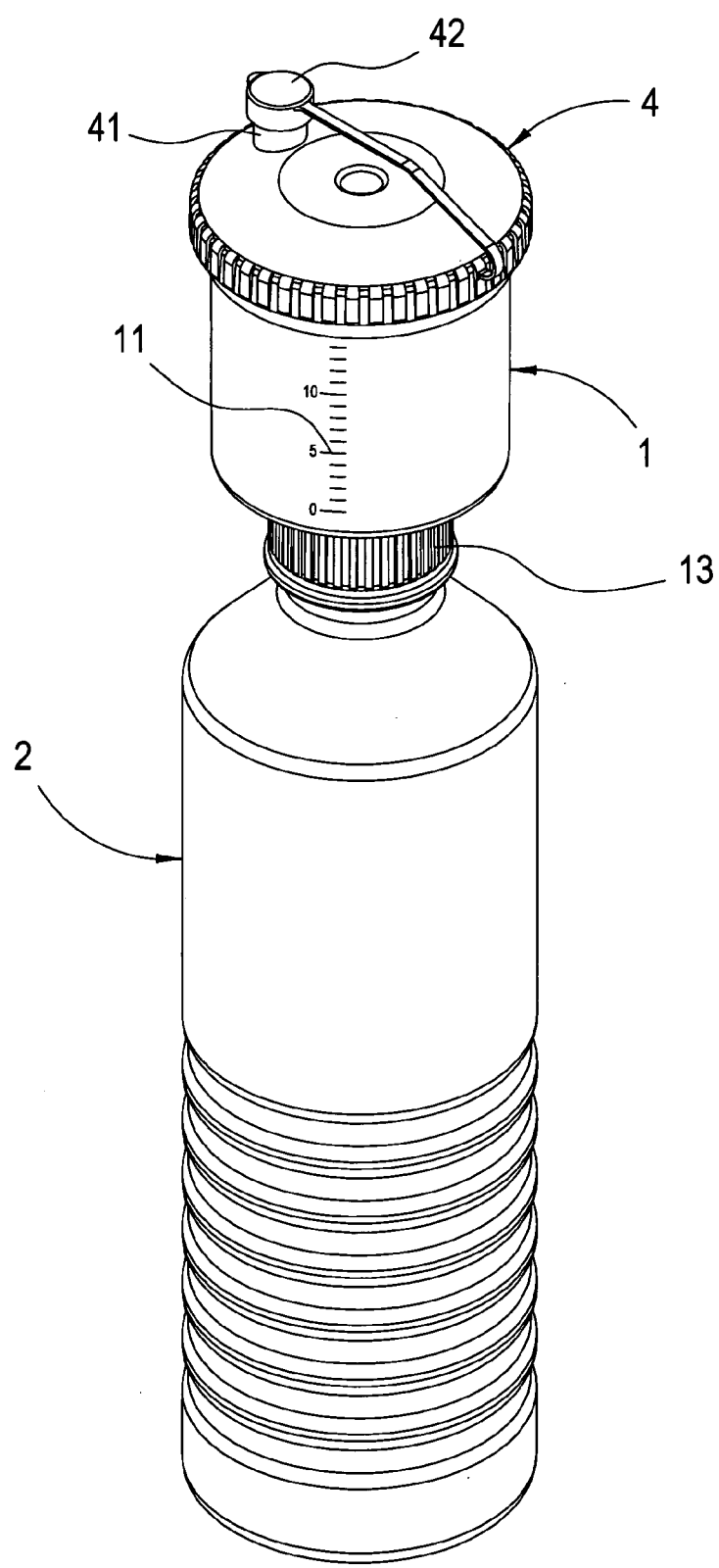
FIG. 3 is a practicing schematic view showing a quantitative liquid dispenser according to the present invention.

Please refer to FIGS. 1–3 which illustrate a quantitative liquid dispenser. The dispenser includes:

- a container 1, wherein plural equidistant graduations 11 are located on an inner wall of the container 1, a cylinder 12 is mounted at a central portion of a bottom of the container 1, the cylinder 12 is connected with the container 1, a closure 13 is mounted between the container 1 and the cylinder 12, and the closure 13 can be locked on a mouth 21 of a bottle 2 with different standards (as shown in FIG. 3);

- a regulator cock 3 having a plate 31, a pillar 32 extended from a bottom end of the plate 31, a circular prominence 33, a guiding hole 34 centrally penetrating through the pillar 32 and the plate 31, and a corkscrew guiding block 35 properly positioned inside the guiding hole 34, wherein the pillar 32 of the regulator cock 3 is perforated into the cylinder 12 of the container 1 for fixedly assembling the regulator cock 3 and the container 1, and the circular prominence 33 owns an effect of preventing a liquid from following in or flowing back;

- an upper cover 4, wherein an outlet 41 is mounted on the upper cover 4, a safety cover 42 is connected to the upper cover 1 through a rim thereof and is covered on the outlet 41, a guiding pillar 43 is downwardly extended from a bottom of the upper cover 4 and has plural equidistant corkscrew guiding troughs 44 respectively mounted at two sides thereof, wherein the guiding pillar is perforated into the guiding hole 34 of the regulator cock 3 so that the corkscrew guiding block 35 of the regulator cock 3 can be engaged with one of the corkscrew guiding troughs 34 of the upper cover 4;

thereby forming the quantitative liquid dispenser through assembling thereof.

Please refer to FIGS. 4A–4C which illustrate sectional drawings showing the operations of the quantitative liquid dispenser. Firstly, turn the upper cover 4 clockwise so as to synchronously raise the regulator cock 3 upwardly to a desired graduation 11 and then adjust the regulator cock 3 to be horizontal to the graduation 11. Sequentially, lock the closure 4 on a mouth 21 of a bottle 2 filled with a liquid. After being locked, the user only need to extrude the bottle for pushing the liquid up to flow upwardly through a chink between the guiding hole 34 of the regulator cock 3 and the guiding pillar 43 of the upper cover 4 so as to reach the container 1. When the liquid flows therein but exceed the plate 31 of the regulator cock 3, the redundant liquid will automatically flow back to the bottle 2 through the chink 5 between the guiding hole 34 of the regulator cock 3 and the guiding pillar 43 of the upper cover 4. Finally, for pouring out the liquid through the outlet 41, the user can open the safety cover 42 of the upper cover 4 so as to quickly, easily, and simply determine a fixed amount of liquid.

The quantitative liquid dispenser according to the present invention, when being compared with the other prior arts, further includes the advantages as follows:

1. Through utilizing the regulator cock of the present invention, it can accurately measure a desired amount of liquid for avoiding wasting redundant liquid.

2. The present invention provides an easy and quantitative liquid dispenser which is suitable for measuring all kinds of liquids, for example, a cleaner, an insecticide, a concentrate, or a lightly concentrated cream so as to save the cost of paying another dilution bottle.

3. The present invention provides an easy and quantitative liquid dispenser having a safety cover mounted thereon for avoiding the liquid from being spilled out so that the user will not be touched by the liquid even dangerous ones, ex: sulfuric acid, and therefore a safe dispenser can be achieved.

4. The present invention provides an easy and quantitative liquid dispenser having a characteristic of quantitatively measuring a liquid so as to achieve an easy and simple usage and efficiency.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A quantitative liquid dispenser, comprising:
   a container having plural equidistant graduations located on an inner wall thereof, a cylinder mounted at a central portion of a bottom thereof and connected therewith, and a closure mounted between said container and said cylinder;
   a regulator cock having a plate, a pillar extended from a bottom end of said plate, a guiding hole centrally penetrating through said pillar and said plate, and a corkscrew guiding block positioned inside said guiding hole, wherein said pillar is perforated into said cylinder of said container;
   an upper cover having an outlet mounted thereon, a guiding pillar downwardly extended from a bottom thereof, and a safety cover connected thereto through a rim thereof, wherein said guiding pillar has plural equidistant corkscrew guiding troughs respectively mounted at two sides thereof and is perforated into said guiding hole of said regulator cock;
   thereby forming said quantitative liquid dispenser through assembling thereof.

2. The quantitative liquid dispenser according to claim 1, wherein said closure is suitable for bottles with different standards so as to lock and fix thereof.

3. The quantitative liquid dispenser according to claim 1, wherein said safety cover is covered with said outlet.

4. The quantitative liquid dispenser according to claim 1, wherein said corkscrew guiding troughs of said upper cover are employed to guide said corkscrew guiding block of said regulator cock so as to downwardly and upwardly move said regulator cock along said guiding pillar.

5. The quantitative liquid dispenser according to claim 1, wherein said corkscrew guiding block of said regulator cock is engaged with one of said corkscrew guiding troughs of said upper cover.

* * * * *